United States Patent [19]
Iwasyk

[11] 3,778,974
[45] Dec. 18, 1973

[54] APPARATUS

[75] Inventor: John M. Iwasyk, Wilmington, Del.

[73] Assignee: E. I. du Pont de Nemours and Company, Wilmington, Del.

[22] Filed: Oct. 19, 1972

[21] Appl. No.: 299,092

[52] U.S. Cl. .................................................. 55/199
[51] Int. Cl. .......................................... B01d 57/00
[58] Field of Search ................. 23/285; 55/52, 191, 55/199; 260/78

[56] References Cited
UNITED STATES PATENTS

| | | | |
|---|---|---|---|
| 2,689,839 | 9/1954 | Heckert | 260/78 X |
| 3,087,435 | 4/1963 | Boucher | 103/89 |
| 3,113,843 | 12/1963 | Li | 23/285 |
| 3,134,655 | 5/1964 | Boucher | 55/52 |
| 3,241,296 | 3/1966 | Ramsey | 55/199 |
| 3,361,537 | 1/1968 | Ferrante | 159/6 X |
| 3,473,896 | 10/1969 | Halder et al. | 23/285 |

Primary Examiner—Frank A. Spear, Jr.
Assistant Examiner—R. W. Burks
Attorney—Howard P. West, Jr.

[57] ABSTRACT

A steam polymer separator is provided that includes an upright tubular vessel having an outlet adjacent the bottom thereof, and a transfer screw with a shaft extending through the bottom of the separator. An open cage structure is attached to the top of the screw. In order to accentuate plug flow in the melt pool in the vessel, the cage structure is modified with a centrally positioned bottomless cup attached thereto. The size and shape of the cup are determined by formulae.

2 Claims, 4 Drawing Figures

APPARATUS

BACKGROUND OF THE INVENTION

This invention relates to the production of synthetic polymeric material and more particularly to an apparatus useful in producing such material.

Condensation polymers such as the polyamides were initially produced by batch processes in autoclaves, but continuous polymerization processes have been developed, and are generally preferred for present day commercial operation. A typical continuous polymerization process (abbreviated "CP" process herein, for convenience) is described by Li in U.S. Pat. No. 3,113,843. The apparatus elements shown in FIG. 1 of Li include a first reactor 10, in which an aqueous polyamide forming composition is partially polymerized at amidation pressure and temperature; a second reactor 12 wherein polymerization continues at amidation temperature while the pressure is reduced to atmospheric or below, while flashing off steam, and a steam polymer separator 14, in which the steam generated by continuing polycondensation is separated from the polymer. For polymer of especially high molecular weight, the separator 14 is conventionally followed by a finisher 16.

Although CPs such as the above, and others described in the prior art, function very satisfactorily for the commercial nylons of moderate melt viscosity such as are conventional for poly(hexamethyleneadipamide), the increasing need for ever higher molecular weight polyamides and the development of polyamides which because of their molecular structure have very high melt viscosity, require new CP technology adapted to handle viscosities which are typically 5 to 50 times that of 66 nylon for textile uses.

It has been recognized that a reactor operating under plug flow conditions will provide the most uniform residence time for reactants traversing a reaction zone; achieving this type of flow becomes increasingly difficult as reactant viscosity increases and in general one can only approach the theoretical. A pumping process designed to attain this type of flow has been disclosed by Boucher in U.S. Pat. No. 3,087,435 which also discloses the use of the process in polymerizations. In that patent, the use of a narrow blade helical forwarding element is disclosed which advances the polymer next to the wall by providing a force component in the direction of flow, thus attaining essentially plug flow throughout the vessel cross section. Unfortunately, the helical wall scraper of Boucher merely serves as a mixer for liquids having a melt viscosity of 1,000 to 100,000 poise, especially when the helical wall scraper serves to feed a screw pump at the outlet of the vessel, or when flow from the outlet of the vessel is otherwise restricted.

It is an object of the present invention to provide an improved steam polymer separator to replace vessel 14 of Li, wherein high velocity gas (e.g., steam) is separated from high viscosity polymer while the latter continues to polymerize as it is moved uniformly through the separator under conditions which avoid mixing and which approach plug flow. The separator is especially adapted to receive polymer discharged from nozzle 43 of U.S. application, Ser. No. , filed concurrently herewith and assigned to the assignee of this invention. The apparatus of the present invention also has sufficient flexibility so that it is operable at throughput rates over 2½ fold range while maintaining constant product characteristics.

SUMMARY OF THE INVENTION

In accord with the invention, a jacketed, heated, vessel is provided in which a volatile component (e.g., steam) is separated from a highly viscous melt (e.g., molten polyamide) in the upper part, while the liquid melt is collected in a pool in the lower part. The melt traverses the vessel under the influence of gravity in plug flow, which is induced by shearing forces mechanically produced at the vessel wall.

The melt flows into the vessel in such a way that it is uniformly distributed on the surface of the melt pool, most of the steam entering the separator vessel has been separated from the polymer, but the separation is completed in the vapor space of the separator vessel.

The mechanical shearing forces in the melt pool at the vessel wall are produced by a specially designed basket stirrer which almost scrapes the vessel wall but which produces little or no force component in the direction of the flowing melt. The melt flows by gravity to the entrance flight of a screw pump located at the bottom of the vessel; the basket stirrer is attached to the screw of this pump, thus, providing for its rotation. In order to accentuate plug flow in the melt pool, the melt is likewise subjected to flow modifying viscous drag forces imposed by a bottomless cup of truncated cone shape, submergaed in the melt and attached to and rotating with the basket. When the separator 14 is cylindrical without a conical bottom, the cup would be cylindrical. The size and shape of the cup are determined by formulae given in detail hereinafter.

The screw pump forces the polymer through an exit conduit to its point of use. In a preferred embodiment, the polymer is pumped into a manifold and thence to multiple spinning pumps with associated filters and spinnerets.

DETAILED DESCRIPTION OF THE INVENTION

Figure 1:
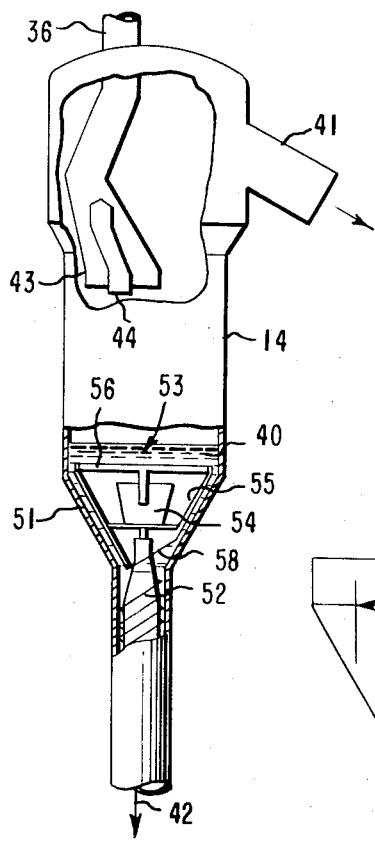
FIG. 1 shows a simplified drawing of the steam polymer separator with a suitable melt distribution nozzle in place.

The apparatus embodiment chosen for purposes of illustration has been generally designated 14 and is a rather tall, cylindrical vessel having its axis vertical. The vessel has a conical bottom 51, which directs polymer melt supplied from inlet conduit 36 to a screw pump 52 via nozzle 43. Attached to the upper end of the screw of the pump (52) is a conical basket-like arrangement 53 and a cup 54, open top and bottom, which (in combination) serve to provide plug type flow of the polymer as it traverses melt pool 40. Since the basket and cup are attached to the screw of the pump, they rotate with it and due to liquid drag of the highly viscous melt, the melt pool also rotates. Screw speeds of 2 to 10 rpm are contemplated; about 4–5 rpm is preferred. The melt distributor nozzle 43 which has the shape of the sector of a circle is positioned with its apex almost on the axis of separator 14, and its base close to the wall of 14, and since it delivers polymer uniformly over a sector of the melt pool 40 immediately below, it necessarily follows that an even layer of molten polymer is laid down on the melt pool as it is rotated by basket 53 and cup 54.

The upper part of separator 14 may be of enlarged diameter as shown in order to avoid entrainment of polymer by the escaping steam. Steam which is disengaged from the polymer leaves separator 14 through steam vent 41 which may be attached to a condenser, vacuum pump, or aspirating jets (not shown), depending on the reaction conditions desired in separator 14.

The larger diameter upper part of the vessel is designed to have an $F$ factor in the range of 0.01 to 0.1, preferably about 0.06. The $F$ factor is the common chemical engineering term for estimating the entrainment capacity of a gas and is defined as:

$$F = v_G \sqrt{P_G}$$

where $v_G$ is the linear velocity of the gas in ft./sec., and $P_G$ is the density of the gas at the point in question, in lb./cu.ft.

The diameter of the lower, liquid containing portion of separator 14 is selected to give the desired holdup time, as dictated by temperature, pressure and reaction rate, in order to attain an output 42 of polymer having the desired viscosity. The degree to which theoretical plug flow conditions are attained, will, of course, determine the separator volume required to provide the desired hold-up time.

The bottom of separator 14 is conical, in order to provide uniform throughput to the feed section of screw pump 52, without stagnant areas. The cone should have a subtended angle of 45 to 90 degrees, preferably about 60°. The inlet to screw pump 52 is at the bottom of separator 14. Positioned within the conical bottom of separator 14 there is a basket stirrer 53. The essential elements of the basket are the struts 55 which are positioned to rotate as close as possible to the sides of conical bottom 51, thus, mechanically shearing the polymer at the vessel wall. The struts may have a slight rake to provide a polymer forwarding force component, but this is usually not needed and may be undesirable. The struts 55 are reinforced by attachment to rings 56. The whole basket is attached to cap screw 57 and is driven by the screw of pump 52.

Struts 55 and rings 56 are as thin as possible consistent with adequate strength for the 17 in. dia. separator, they are conveniently made of ¾ in. × ⅛ in. stainless steel. The may have a modified cross section (e.g., streamline) to minimize stagnation. The number of struts 55 and rings 56 is not critical. At least two and preferably at least four struts should be used; there should be at least one and preferably two rings.

A half screw flight 58 is often useful to impel the polymer into the feed section of the screw pump, but an excessive number of flights must be avoided because they may disrupt the plug flow pattern.

In order to maintain a flow pattern approaching plug flow as the polymer passes through the melt pool to the screw pump, a carefully dimensioned bottomless conical cup 54 is attached to the basket stirrer by means of from two to four narrow struts 59 extending from the mid-point of the basket to the bottom of the cup.

Figure 3:
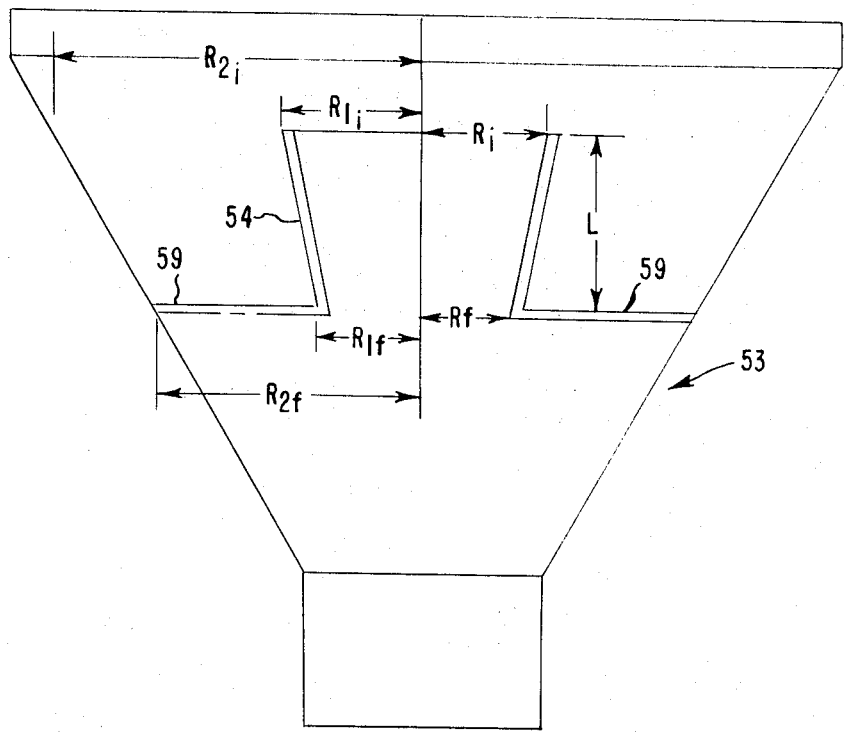
FIG. 3 identifies the symbols representing the dimension parameters used in designing the flow control cup which helps to control flow of the viscous melt.

FIG. 3 shows schematically the location of the conical cup 54 in the basket stirrer 53. The stirrer is, of course, immersed in the melt pool 40 of the separator. Fluid flows vertically into the converging region of the melt pool, and is distributed, a part going inside the cup and a part going to the annular region formed by the cup and the converging separator walls. If the cup were not present, the majority of the flow would occur in the central core of the separator, with very low flow near the walls. This is due to the basic parabolic velocity profile associated with laminar flow in a tube. The purpose of the cup is to provide for a uniform distribution of residence times by lowering the velocity in the center while maintaining the velocity in the wall region.

The dimensions of the cup are determined as follows. The dimensions represented by the letters identified schematically in FIG. 3.

The ratio of the volumetric flow rate in the annular region to that in the conical insert (cup) is given by:

$$Q_A/Q_c = [2g(v) (R_2 - R_1)^3{}_f (R_2 + R_1)_f/3 \, f(\alpha, \beta) \, R_f] \quad (1)$$

where
$Q_A$ = Volumetric throughput rate in annular region
$Q_c$ = Volumetric throughput rate in conical insert
$\alpha = [(R_2 - R_1)_i - (R_2 - R_1)_f /(R_2 - R_1)_f]$
$\beta = [(R_2 + R_1)_i - (R_2 + R_1)_f/(R_2 + R_1)_f]$ $$V = (R_1 - R_f)/R_f$$
(2)

$$f(\alpha,\beta) = \frac{\beta^2}{(\alpha-\beta)^3} \ln\left[\frac{(1+\alpha)}{(1+\beta)}\right]$$

$$-\frac{\alpha\beta}{(\alpha-\beta)^2(1+\alpha)} + \frac{\alpha(1+\alpha/2)}{(\alpha-\beta)(1+\alpha)^2}$$

$$g(v) = (1+v+v^2/3)/(1+v)^3$$
(3)

and where $$f(\alpha,\beta) \rightarrow (1+\alpha+\alpha^2/3)/(1+\alpha)^3$$
$$+ [(\alpha-\beta) (\alpha^2+4\alpha+6)/12 \, (1+\alpha)^4] \quad (4)$$

as $\alpha \rightarrow \beta$.

In order to characterize the residence time distribution for the system, an apparent mean residence time t, is calculated as the volume of a particular region A divided by its volumetric throughput rate. The ratio of the apparent mean residence time for the annular space to that in the conical insert is given by:

$$(5) \quad \frac{t_A}{t_o} = \frac{3f(\alpha,\beta)[1 + (\alpha+\beta)/2 + \alpha\beta/3]R_f^2}{2g(v)[1+v+v^2/3](R_2-R_1)_i^2}$$

The dimensions of the conical cup are selected so that the ratios of (1) and (5) approach 1 as closely as possible.

For convenience, the letters used in the equations are identified in Table I.

TABLE I $f(\alpha\beta)$ — Defined in Equation 2, dimensionless
$g(v)$ — Defined in Equation 3, dimensionless
L — Length of conical insert, in.
Q — Volumetric throughput rate, in.³/sec.
R — Inside radius of conical insert, in.
$R_1$ — Outside radius of conical insert, in.
$R_2$ — Inside radius of separator, in.

$t$ — Apparent mean residence time, sec.
$V$ — Volume
$x$ — Coordinate in flow direction, in.
$\alpha$ — $[(R_2-R_1)_i-(R_2-R_1)_f]/(R_2-R_1)_f$, dimensionless
$\beta$ — $[(R_2+R_1)_i-(R_2+R_1)_f]/(R_2+R_1)_f$, dimensionless
$v$ — $(R_i-R_f)/R_f$, dimensionless

SUBSCRIPTS $i$ — refers to insert inlet
$f$ — refers to insert outlet
$A$ — refers to annular region
$c$ — refers to conical insert The calculations required when values are substituted in equations 1–5 are conveniently carried out on a computer.

The top of the conical cup should lie beneath the surface of the melt pool 40 at all throughput rates; preferably, it will lie not more than 1½ – 2 inches below the bottom of the cylindrical portion of separator 14.

The bottom of the cup must be kept sufficiently above the tip of the screw of pump 52 so that the flow cross section is everywhere at least as great as the flow cross section at the inside of the conical cup. Stated in other terms, the bottom of the cup must be kept sufficiently far from the tip of the screw and associated hardware so that polymer flow through the cup will not be decreased.

Since the above considerations locate the top and the bottom of the cup, the geometry of the bottom cone of separator 14 will determine length L.

Figure 4:
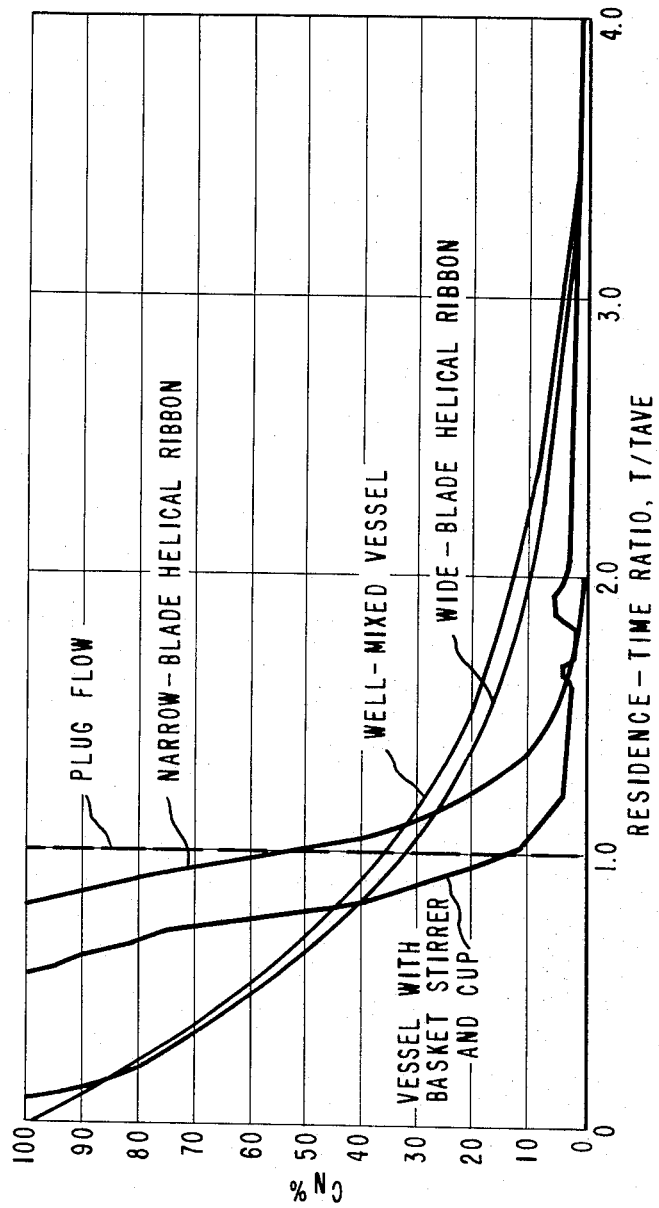
FIG. 4 shows curves which demonstrate the degree to which the apparatus arrangement of the invention approaches theoretical plug flow conditions.

FIG. 4 shows the experimentally determined residence time distribution for melt flowing in a steam polymer separator having a basket stirrer and flow control cup, in accord with the instant invention. Also shown on this Figure is a calculated curve showing time of residence, for plug flow of the liquid (the ideal) This chart has the residence time ratio as the abscissa and a concentration function as the ordinate. The unity value on the abscissa corresponds to the time at which a material flowing in plug flow fashion would emerge from the separator 14. The other values are the ratios of actual times to this plug flow time. The concentration function on the ordinate represents the percent of a material which originally entered the pipeline in uniform distribution across the flow front that still remains in the pipeline at any time shown by the abscissa.

In this comparison, by definition, all of the material that would be flowing in plug flow fashion would have left at the time ratio indicated by unity on the abscissa and, therefore, the plug flow curve of operation is a step function dropping vertically from 100 to zero at the abscissa value = 1.

In the laminar flow case, the distribution of velocities across the cross section is parabolic and it can be calculated by straightforward mathematical techniques based upon such a parabolic distribution that a component entering in uniform distribution across the pipeline cross section will drop in concentration according to the curve shown for laminar flow. With this type of flow, 100 percent of the material would still be present at half the plug flow time (0.5 on the abscissa), 25 percent of it would still be present at the ordinate of one, 6 percent of it would be present at twice the plug flow time, and 1 percent of it would still be present at 5 times the plug flow time. The curve is not shown in FIG. 4.

The experimental line shown on this curve for the basket stirrer and cup conveyor of this invention shows a very great improvement over the laminar flow situation approaching surprisingly closely to the desired plug flow. In this case, the concentration begins to drop sharply at about five/tenths of the plug flow time; at approximately plug flow time, only 12 percent of the original material remains in the separator.

Also shown, is the calculated curve for the out flow from a well mixed vessel wherein the out flow begins at zero time; 36 percent of the material remains at the plug flow time and 1 percent of the material still remains at four times the plug flow time.

Another curve on FIG. 4 shows the performance of a wide blade helical ribbon, and it will be observed that the line follows very close to that representing the well mixed vessel. This curve indicates clearly that a wide blade helical ribbon is not effective in promoting plug flow but rather is a good mixer. The advantages obtained by the present invention are not obtained by using such wide blade mixers.

Figure 2:
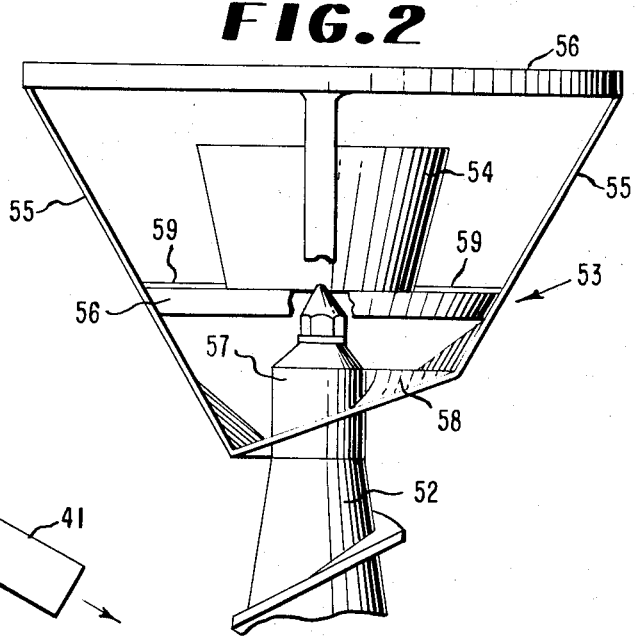
FIG. 2 shows the construction of the basket stirrer and the flow control cup.

The final curve shown in FIG. 4 illustrates the performances of a narrow-blade helical ribbon stirrer such as the one disclosed in FIG. 2 of Boucher U.S. Pat. No. 3,087,435, when operated in a liquid having a viscosity of 10 to 100 poise. This curve shows excellent performance. However, when tested with liquid having a viscosity in the range of 1,000 to 5,000 poise, the performance was no better than the wide blade helical stirrer also shown in FIG. 4.

The apparatus of this invention is highly useful for handling any very high viscosity liquid in a manner to avoid unmodified laminar flow. It is especially suitable for the handling of such materials at high temperature. Expecially suitable liquids are the thermoplastic polymers, such as polystyrene, polyvinyl chloride, polyvinylidene chloride, cellulose acetate/butyrate, polyamides, polyesters, polyethers, polyoxymethylene, polyethylene, polypropylene, and the like, as well as copolymers, graft copolymers, and polymer mixtures of these and others. High viscosity polymer solutions are also included, as well as sucrose solutions, high viscosity petroleum fractions, resins, varnishes and the like.

What is claimed is:

1. In a steam polymer separator apparatus including an upright tubular vessel having an outlet adjacent the bottom thereof, a transfer screw having a drive shaft extending through said bottom, a spiral ribbon flight extending upward from said screw; and an open cage structure attached to and supported by the flight, said structure including spaced annuli peripherally proximal to said vessel and a plurality of radially spaced struts interconnecting said annuli, the improvement comprising: a bottomless cup centrally positioned and attached to said cage.

2. The apparatus as defined in claim 1, said cup being in the shape of a truncated cone.

* * * * *